May 19, 1942.                R. L. DAINE ET AL                2,283,418
                              DISPLAY DEVICE
                      Original Filed Feb. 4, 1938    5 Sheets-Sheet 1
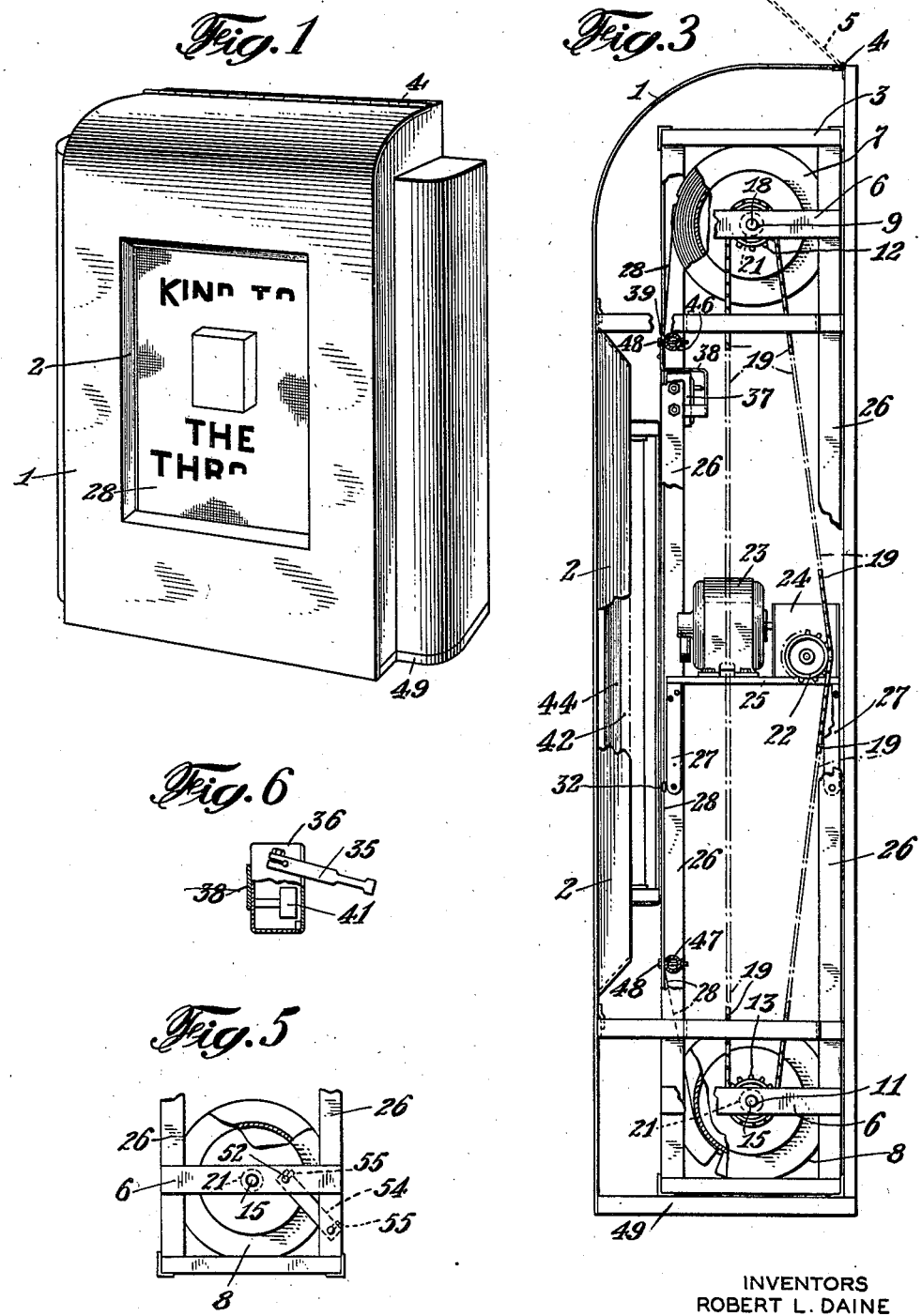
INVENTORS
ROBERT L. DAINE
HAROLD F. MAY
BY M. J. Reynold
ATTORNEY

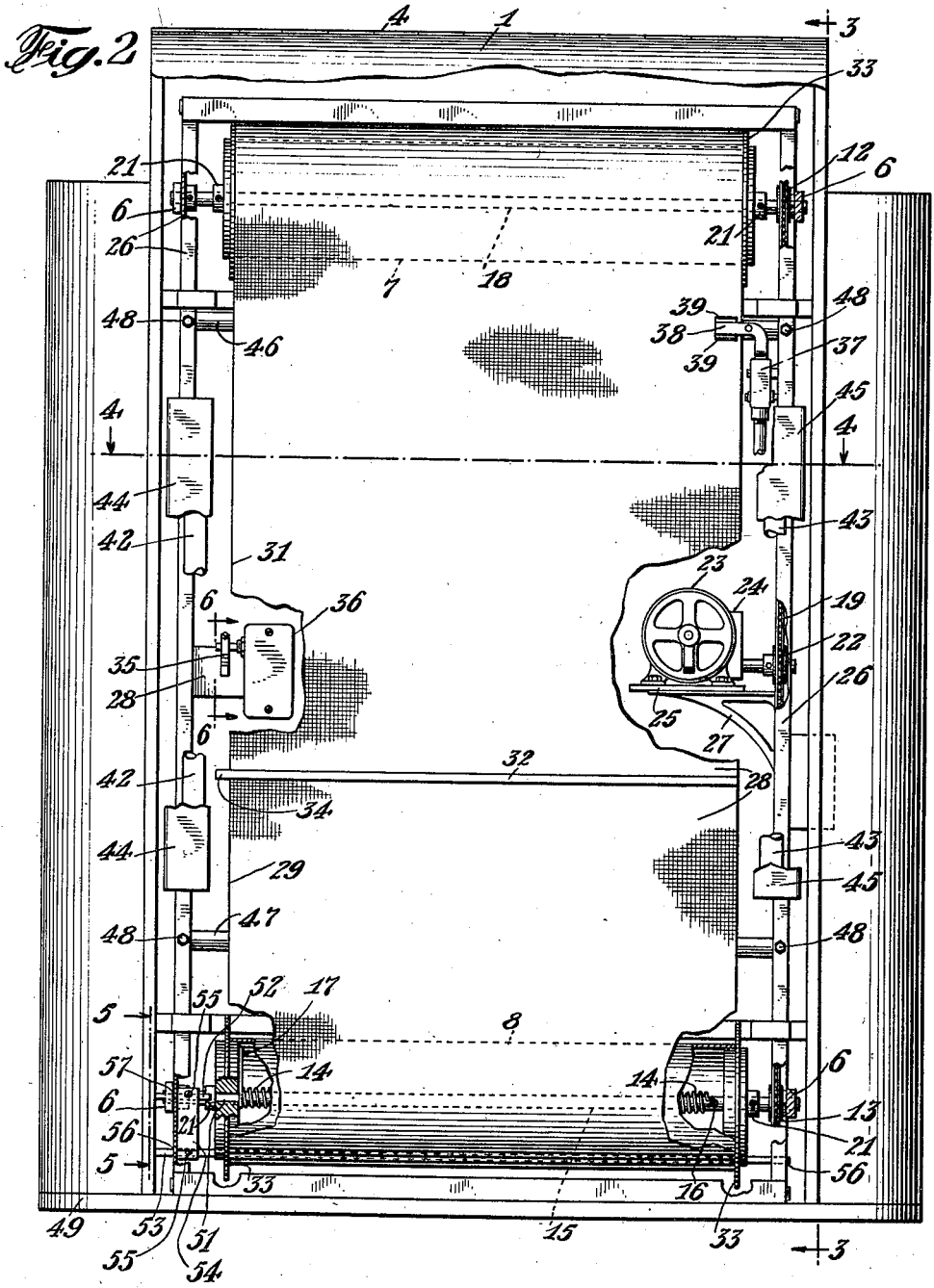

May 19, 1942.    R. L. DAINE ET AL    2,283,418
DISPLAY DEVICE
Original Filed Feb. 4, 1938    5 Sheets-Sheet 3
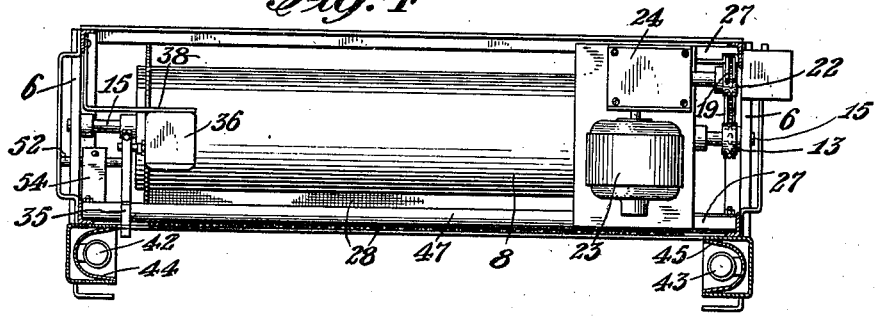
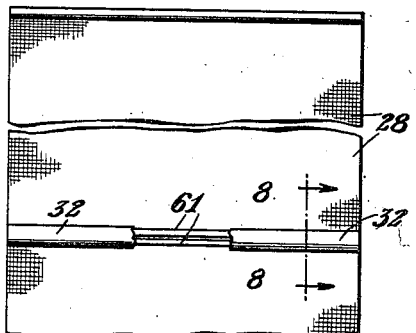
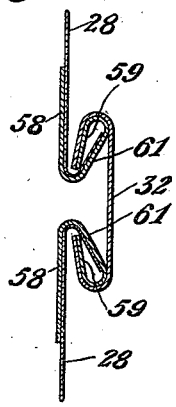
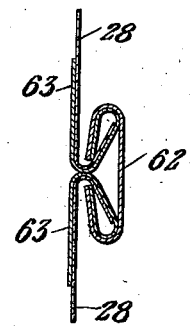
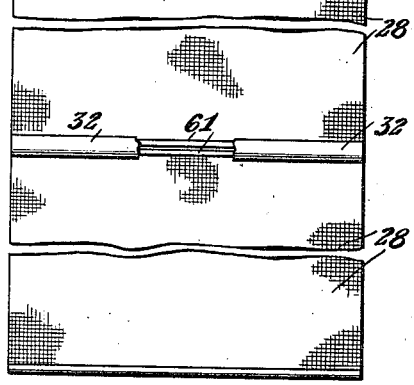
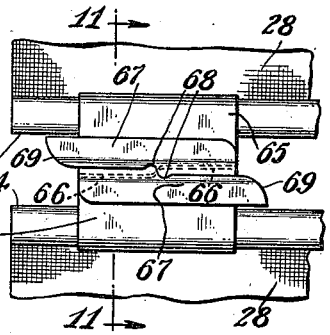
INVENTORS
ROBERT L. DAINE
BY HAROLD F. MAY
M. J. Reynolds
ATTORNEY May 19, 1942.  R. L. DAINE ET AL  2,283,418
DISPLAY DEVICE
Original Filed Feb. 4, 1938   5 Sheets-Sheet 4
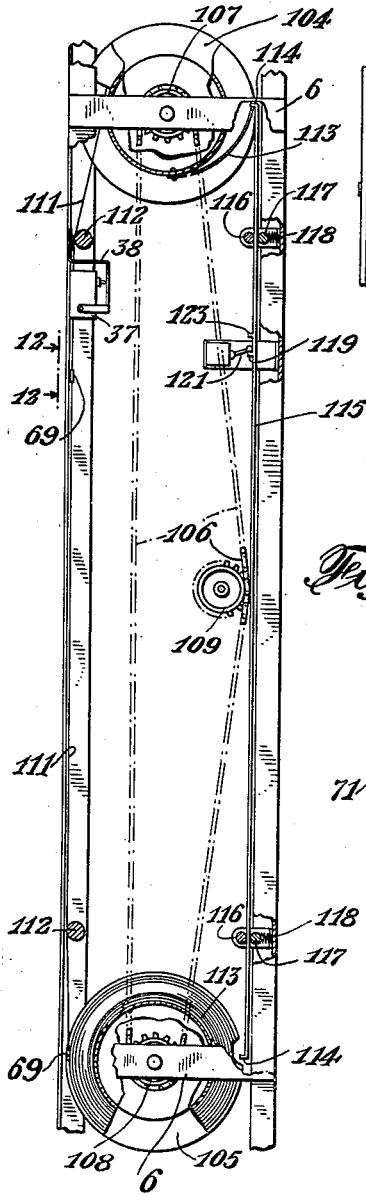
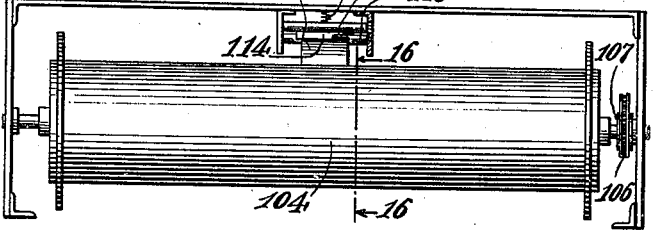
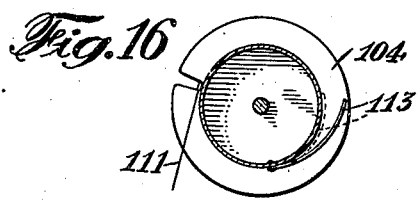
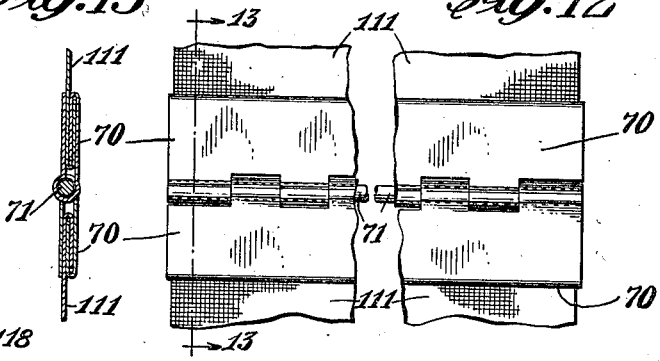
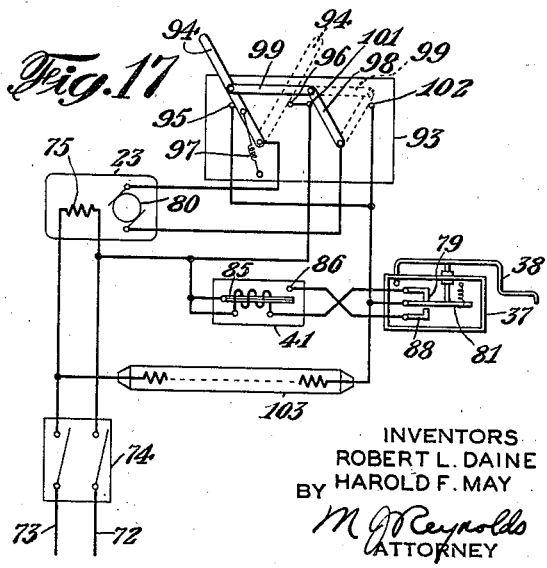
INVENTORS
ROBERT L. DAINE
HAROLD F. MAY
BY
M. J. Reynolds
ATTORNEY

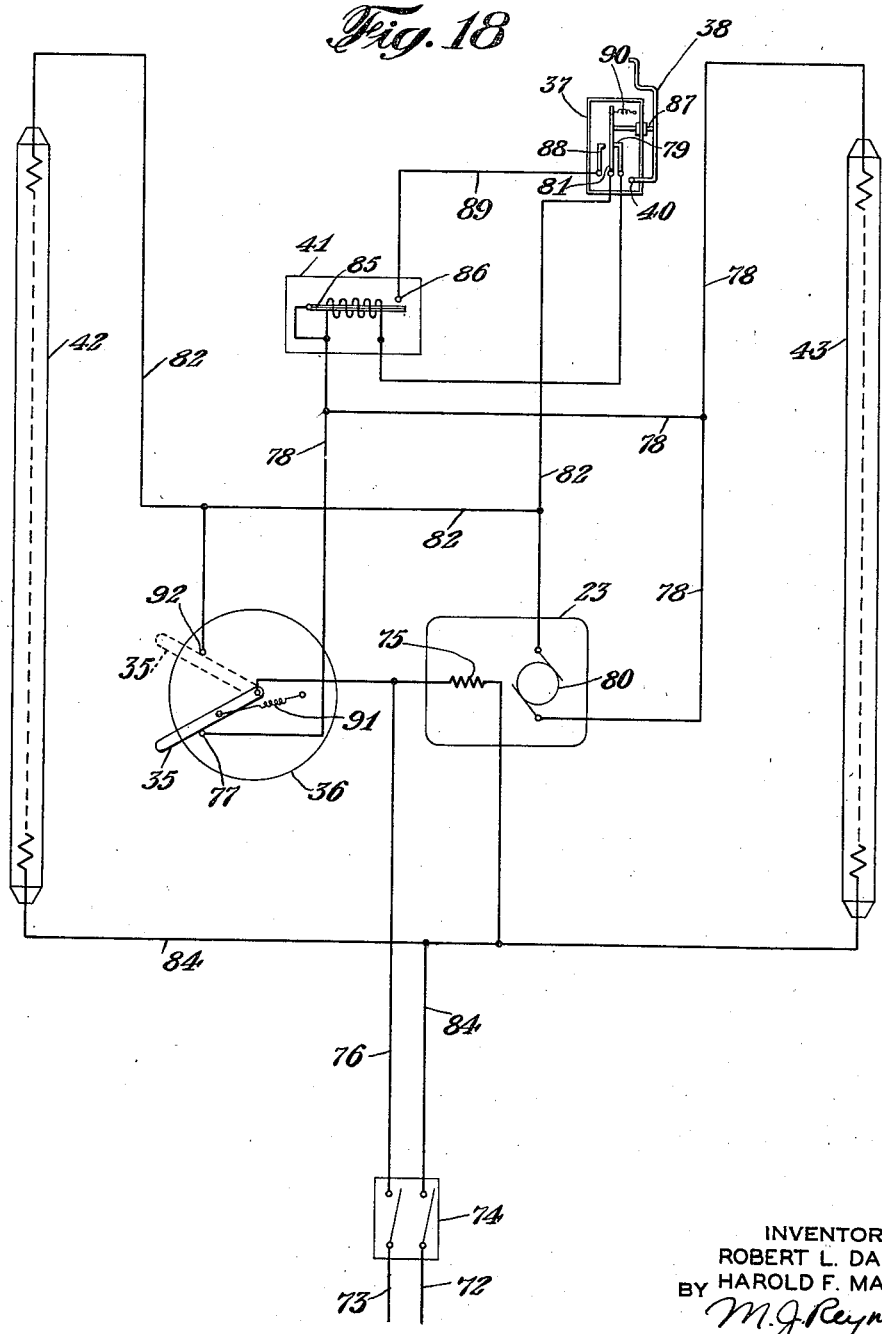

Patented May 19, 1942

2,283,418

UNITED STATES PATENT OFFICE 2,283,418

DISPLAY DEVICE

Robert L. Daine, Greenwich, Conn., and Harold F. May, Valley Stream, N. Y., assignors to The Teleregister Corporation, New York, N. Y., a corporation of Delaware Application February 4, 1938, Serial No. 188,672
Renewed September 6, 1939

10 Claims. (Cl. 40—53)

This invention relates to an automatic advertisement display device wherein display panels are exposed to view successively through an aperture in a cabinet or housing.

It has been the general practice heretofore to employ devices having a series of advertising cards which are moved into the display position in successive order, to flash the advertisements on the screen, or to exhibit the advertising matter by means of character forming elements co-acting with a movable tape. These types of advertising or sign exhibiting devices are complicated in structure and expensive to install and operate. They frequently afford an inferior grade of advertising medium due to the imperfect formation of the characters and the limited effects obtainable with this general type of sign exhibiting apparatus.

The present invention comprises a simple and inexpensive device for automatically displaying colored posters or the like representing advertisements successively, wherein full advantage may be taken of all the artistry employed in the composition of such posters and enhanced by a new and improved lighting arrangement whereby attention is attracted to the advertisements and the same may be clearly read from a considerable distance.

One of the objects of the invention is to provide a web comprising a series of connected advertising posters or the like intermittently moving within a housing whereby the posters are displayed in succession and a lighting arrangement operates when the web is not in motion for effectively illuminating the displayed posters.

Another object is to provide improved means for reversing the direction of movement of the web at the end of its travel in either direction.

An additional object resides in the combination of circuits and parts employed for arresting the motion of the web at predetermined positions thereof.

A further object of the invention is in the provision and control of means for illuminating the posters while the web is in motion and differently illuminating the displayed posters while the web is at rest.

Another object of the invention resides in the provision of suitable means for quickly stopping the motion of the web as each poster is brought into the display position.

Another object is to provide a device of the character shown and described which can be manufactured economically, and possesses the qualities of simplicity, effectiveness and durability.

Still further objects will be apparent from a consideration of the following description and drawings, of which—

Fig. 1 is a perspective view of the display device, shown on a greatly reduced scale;

Fig. 2 is a front elevation of the device with the cover and certain other parts partly broken away;

Fig. 3 is a vertical section taken on the line 3—3 of Fig. 2;

Fig. 4 is a view, partly in section, taken along the line 4—4 of Fig. 2 with the housing removed;

Fig. 5 is a fragmentary view, in elevation, with certain parts broken away, taken on the line 5—5 of Fig. 2;

Fig. 6 is a view of certain details, taken along the line 6—6 of Fig. 2;

Fig. 7 is a view of the web;

Fig. 8 is a view along the line 8—8 of Fig. 7;

Fig. 9 is a view of an alternative arrangement for attaching the sections of the web together;

Fig. 10 shows another method of attaching the sections of the web together;

Fig. 11 is a view along the line 11—11 of Fig. 10;

Fig. 12 is a view along the line 12—12 of Fig. 14;

Fig. 13 is a view along the line 13—13 of Fig. 12;

Fig. 14 is a view in side elevation of another embodiment of the invention, with certain parts broken away;

Fig. 15 is a plan view of the device of Fig. 14 with certain parts broken away;

Fig. 16 is a view along the line 16—16 of Fig. 15;

Fig. 17 is a diagram of the control and lighting circuit employed in the device; and Fig. 18 is a diagram of the control and lighting circuit employed in another embodiment of the invention.

Referring now to the drawings specifically, in which like numerals of reference are employed to designate like parts throughout the several views, the numeral 1 is employed to designate the housing and the numeral 2 an aperture within the housing through which the posters or other advertising matter are displayed.

Referring to Fig. 3 of the drawings, the housing 1 is shown attached to the rear cover of the framework 3 by a hinge 4 whereby the front of the housing may be raised as indicated by the portion 5 thereof, to enable the attendant to obtain access to the mechanism within the housing as, for example, when it is desired to change the series of connected posters. The framework 3 has attached thereto suitable members 6 for supporting rollers 7 and 8 at bearings 9 and 11 respectively. The roller 7 is connected with the sprocket wheel 12 and the roller 8 is connected with the sprocket wheel 13 by means of a spring 14, Fig. 2, one end of the spring 14 being secured to a shaft 15 by means of a screw 16 and the other end of the spring being secured to the roller 8 by the screw 17. The roller 7 is mounted on the shaft 18 and is driven by a sprocket wheel 12 in accordance with the movement of a driving chain 19. The rollers 7 and 8 are prevented from moving longitudinally by thrust collars 21 secured to the shafts 15 and 18. The chain 19 also engages the driving sprocket wheel 22 connected to the electric motor 23 through a gear box 24. The motor is supported by the shelf 25 secured to the frame members 26 by the brackets 27.

Wrapped around the rollers 7 and 8 is a web 28 comprising a series of posters such as 29 and 31 attached together by a series of clips 32. The ends of the web are attached to the roller in any well-known manner as, for example, by a clip or by the use of an adhesive material. The rollers are preferably provided with flanges 33 to maintain the web in alignment with the rollers as the device operates. The clips 32 comprising the ends of the series of clips nearest the ends of the web are provided with a projecting portion 34 which engages the arm 35 of a switch mechanism 36 to cause the switch mechanism to operate and reverse the motor when the web has reached the end of its travel in either direction. Also secured to the framework is a switch device 37 having an extension 38 projecting therefrom, the extension being provided with a curved portion 39 adapted to be engaged by any of the clips 32 thereby to operate the switch device 37 and cause the web to be temporarily arrested in its movement as will be hereinafter more fully explained in detail. A thermal device 41, shown diagrammatically on Fig. 6 and schematically on Figs. 17 and 18 of the drawings, is mounted preferably within the switch mechanism 36, although it may be mounted in any other suitable location without interfering with the operation of the device.

A pair of lamps 42 and 43 are mounted adjacent to the web and preferably behind the housing 1 for illuminating the posters comprising the web in a distinctive manner in accordance with the operation of the device. The lamps are partially enclosed by reflecting shields 44 and 45 whereby the rays of the lamps are reflected and directed against that portion of the web exposed to view through the aperture in the housing. The web is maintained in alignment with the aperture by the curved pieces 46 and 47 secured to the framework by the bolts 48, the web passing over the curved pieces as the device operates in either direction. The curved piece 46 additionally supports the clips 32 to cause the switch device 37 to be operated by the passage of the clip between the curved piece 46 and the extension 38 of the switch device 37. The device rests upon a base 49 whereby it may be operated in any desired location as, for example, in the windows of stores, telegraph offices and the like by merely connecting the device to a source of electric power.

The roller 8 is provided with a recess 51 adapted to be engaged by a pin 52 connected to a rod 53 by means of a member 54 secured thereto by screws 55. The rod 53 extends through the framework at the bearings 56 and the pin 52 at the bearing 57. With the pin 52 in the position shown on Fig. 2 of the drawings the drum 8 is allowed to rotate. When the cam 54 is moved to the right, however, the pin 52 engages the recess 51 of the roller to prevent the roller from being rotated by the spring 14 when the web is removed therefrom as, for example, when the series of posters is to be changed, the shaft 15 being prevented from rotating at this time by the gear mechanism within the gear box 24 and the motor 23 which, as will be described, is disconnected from the source of power during the poster changing operation. A portion of the web 28 is shown on Fig. 7, the different posters thereof being held together by the several clips 32. The construction of these clips may be as shown on Fig. 8, wherein the end of each poster is brought into coincidence with a metal strip 58 having a bent over portion 59 formed to grip the poster at the points 61. The clip 32 engages the portion 59 of the metal strips 58 in the manner shown on the drawing thereby to attach the ends of adjacent posters together and maintain the ends of the posters in a straight line with respect to one another. In applying the clip 32, the metal strips 58 are brought together and the clip placed over the same, after which the strips 58 are brought into the position shown on the drawing and there maintained by the action of the spring 14.

Fig. 9 shows an alternative arrangement of fastening the posters together to form a web, the clip 62 being formed in such a manner as to hold the strips 63 in close abutting relationship with each other. The clip 62 is placed in position by sliding the clip endways along the strips 63.

Another method of attaching the posters together is shown on Figs. 10 and 11. In these figures the metal strips 64 are formed about the clips 65 to securely hold each clip to its respective poster. Each of the clips 65 is provided with a slot 66 and an offset portion 67 whereby the clips may be hooked together as shown on Fig. 11. Each of the clips is also provided with a notch 68 which engage each other and thus lock the clips together. The clips may, however, be locked by bending the ends 69 about the companion clip as an additional means of locking the clips together. When this method of attaching posters together is employed, sufficient clips are provided at the ends of each poster for holding the strips 64 in alignment with one another.

Figs. 12 and 13 disclose an optional arrangement for attaching the posters to one another. In this arrangement the metal strips 70 are formed about the poster in the manner indicated on Fig. 13 and held together by a hinge pin 71 which may be of any suitable material.

The operation of the device will be best understood by a consideration of the circuit diagrams shown on Figs. 17 and 18 of the drawings. Referring first to Fig. 18, a source of power, which may be either direct or alternating current, indicated by the conductors 72 and 73, is connected to the device by closing the switch 74. With the switch 74 closed the field 75 of the motor 23 is energized and a circuit is completed from conductor 73 through the switch 74, conductor 76, arm 35 of the switch mechanism 36, contact 77, conductor 78 through the winding of the thermal device 41, contact 79 of the switch 37, arm 81, conductor 82, lamp 42, conductor 84, and switch 74 to the conductor 72. The bimetallic element 85 is heated over the circuit just traced and, when sufficiently heated, engages contact 86. A circuit is also closed from the energized conductor 76, through the arm 35 and contact 77 of the switch mechanism 36, conductor 78, motor armature 80, conductor 82, and lamp 42 to the energized conductor 84, causing the motor to operate and move the web upward, with the lamp 42 either dimly lighted or extinguished, as the case may be, in accordance with the wattage of the lamp employed. The lamp 43 is brightly lighted over the circuit comprising the energized conductor 76, arm 35, contact 77, conductor 78, and lamp 43 to energized conductor 84.

The movement of the web is continued until a clip 32, Figs. 2 and 3, engages the extension 38 of the switch device 37, causing the plunger 87 to be operated and disengage the arm 81 from the contact 79 and bring it into engagement with contact 88. When this occurs, the circuit to the heater coil of the thermal device 41 is interrupted and the temperature of the bimetallic element 85 begins to drop. The engagement of arm 81 with the contact 88 completes the circuit from one side of the motor armature 80, through conductor 82, arm 81, contact 88, conductor 89, contact 86, element 85, conductor 78 to the other side of the motor armature, thereby short-circuiting the motor armature and quickly bringing the web to rest with the clip 32 in engagement with the switch extension 38. With the motor shorted in the manner just described, the lamp 42 is connected directly across the line over the circuit comprising conductor 76, arm 35, contact 77, conductor 78, element 85, contact 86, conductor 89, contact 88, arm 81, conductor 82, lamp 42, and conductor 84.

When the temperature of the bimetallic element has dropped sufficiently, contact 86 is opened removing the short circuit from the motor armature, thus causing the motor to reoperate and the movement of the web to be resumed. The lamp 42 is now in series with the motor armature and the current through the lamp is thus reduced sufficiently to cause the lamp to be extinguished or greatly reduced in brilliancy.

As the clip 32 is carried by the web out of engagement with the switch extension 38, spring 90 moves the arm 81 away from contact 88 and into engagement with contact 79, thereby completing the circuit to the heater coil of the thermal device 41 and thus bringing the element 85 into engagement with contact 86 to prepare a circuit for short-circuiting the motor armature when the switch device 37 is again operated by a clip 32 of the web.

The cycle of operations just described is repeated until the projecting portion 34 of the last clip 32 of the series of clips engages arm 35 causing it to move upward and assume the position shown in dotted outline on Fig. 18. The latter part of the movement of the arm 35 is assisted by the spring 91 which holds the arm in engagement with either of the contacts 77 and 92 of the switch mechanism. As the switch arm 35 is disengaged from contact 77, the circuit extending from conductor 76 to one side of the motor armature is interrupted and as the arm 35 is brought into engagement with contact 92, a circuit is completed from the conductor 76 to the other side of the motor armature, thereby reversing the direction of the current through the motor armature and causing the motor to be reversed and the upward movement of the web to be momentarily arrested and the web to be moved downwardly. The circuit for operating the motor in the reversed direction is traced from energized conductor 76, arm 35, contact 92 of the switch mechanism 36, conductor 82, motor armature, conductor 78, lamp 43 to the energized conductor 84. The circuit through the heater coil is traced from conductor 76, arm 35, contact 92, conductor 82, arm 81, contact 79, the heater coil, conductor 78, lamp 43 and thence to conductor 84. The switch extension 38 is operated by the clips 32 during the downward movement of the web, thereby causing the motor armature to be short-circuited to arrest the motion of the web as each poster is brought into the display position in alignment with the aperture 2. Lamp 43 is caused to be brightly lit during each rest period of the web, the lamp 42 burning brightly during the downward movement of the web and also while the web is at rest during this cycle of operation.

It will be noted from the foregoing that during the movement of the web in one direction and also during the rest period accompanying the movement, the lamp 42 burns brightly and the lamp 43 burns brightly only while the web is at rest, whereas during the movement of the web in the opposite direction and while the web is in the rest position accompanying said movement the lamp 43 burns brightly and the lamp 42 burns brightly only when the web is at rest with the posters in the display position. The intermittent downward movement of the web is continued until the projecting portion 34 of the clip 32 of the last of the series of clips is brought into engagement with the arm 35 of the switch mechanism 36, causing the arm 35 to be disengaged from contact 92 and engaged with contact 77. When this occurs the direction of rotation of the motor is again reversed and the web again moves upwardly and the cycle of operation first described is repeated.

The operation of the embodiment of the device shown on Fig. 17 will now be described. When the switch 74 is closed the field 75 of the motor 23 is energized by a source of power on conductors 72 and 73. The switch mechanism 93 is provided with an arm 94 adapted to be held in contact with either of the contacts 95 or 96 by the spring 97. The arm 94 is connected to the arm 98 by a link member 99, preferably of insulating material, whereby the arm 98 engages contact 101 or contact 102 in accordance with the position of the arm 94. The position of the arm 94 is controlled by the projecting portion 34 of the clips 32 and the function of the switch mechanism 93 is to reverse the direction of movement of the web when the series of posters has been displayed.

With the arm 94 in the position shown on the drawing, the circuit through the motor armature comprises the conductor 73, switch 74, lamp 103, contact 95, arm 94, the motor armature 80, arm 98, contact 101 and thence through the switch 74 to the conductor 72. A circuit is also closed from conductor 73 through lamp 103, arm 81, contact 79 through the winding of the thermal device 41 to the conductor 72, thereby causing the element 85 thereof to engage contact 86 and prepare the circuit in part for short-circuiting the motor armature when the switch extension 38 is engaged by any of the clips 32, thus moving the arm 81 into engagement with contact 88.

The lamp 103 burns dimly while the motor is operating. When the motor armature is short-circuited by the switch device 37, the lamp 103 burns brightly over the circuit comprising conductor 73, lamp 103, arm 81, contact 88, contact 86 and element 85 of the thermal device to conductor 72.

When the series of posters has been displayed the arm 94 is caused to move to the position shown in dotted outline on the drawing by the projecting portion 34 of the last of the series of clips 32. It will be noted that one side of the motor armature is connected directly to the arm 94 and the other side of the armature is connected to the arm 98, and furthermore the contacts 96 and 101 are connected together and contacts 95 and 102 are also connected together, the switch mechanism 93 thus comprising a double pole, double throw switch arrangement for reversing the connections to the motor armature whenever the switch mechanism operates. With the switch arm 94 in position to engage contact 96, the arm 98 engages contact 102 and the direction of current through the motor armature is reversed thereby reversing the direction of rotation of the motor and causing the web to move in the opposite direction, which movement is continued intermittently until the series of posters has been displayed and the arm 94 restored to the position shown on the drawing, thereby again reversing the direction of movement of the motor and web. It will be noted that in this embodiment of the invention a single lamp 103 is employed to produce a bright illumination of the displayed posters while the web is at rest and to differently illuminate the posters while the web is in motion.

Another embodiment of the device is shown on Fig. 14 wherein the upper roller is designated by the numeral 104 and the lower roller by the numeral 105. These rollers are actuated by means of a driving chain 106 which passes over the sprocket wheels 107, 108 and 109, the sprocket wheel 109 being connected through a gear mechanism to a motor which operates the device.

The web 111 passes over the curved pieces 112 as it is wound up by the rollers and maintained in a taut condition by a spring mechanism within either of the rollers which may be similar in construction to the arrangement of the spring 14 shown in Fig. 2. Each of the rollers is provided with a resilient member 113 which is pressed against the roller by the web as the web is rolled about the roller and which assumes the position shown on Fig. 14 when the web is unwound. The end of the member 113 engages the bent portion 114 of the strip 115, causing the strip to move upward when the last of the series of posters has been moved downward into the display position. The strip moves between the rollers 116 and 117, the roller 117 pressing against spring 118 to retain the strip 115 in either of its moved positions. When the strip has been moved upward as indicated on Fig. 14, the projecting portion 119 moves the switch arm 121 upwardly. The movement of the switch arm 121 controls the operation of a switch mechanism 36 or 93, as the case may be, to reverse the motor and cause the web to move upwardly.

When the last of the series of posters has been moved upwardly into the display position, a resilient member 113, mounted on the roller 105, is released by the web and engages the strip 115 causing the strip to move downward and the projecting portion 123 to engage the switch arm 121. The movement of the switch arm 121 downwardly, reverses the motor causing the web to be rewound on the lower roller and press the member 113 against the roller 105.

The device of Fig. 14 is provided with a switch 37 for controlling the stopping of the web as the extension 38 thereof is operated by any of the metal strips 69. It will be understood, however, that while the arrangement of Fig. 12 is shown on Fig. 14 as the means for attaching the several posters together to form a web, any other suitable means may be employed as, for example, the clips of Figs. 8, 9 and 10.

While the invention has been described in detail with respect to certain preferred examples thereof which give satisfactory results, it will be understood by those skilled in the art to which the invention pertains or with which it is most nearly connected, that various changes and modifications may be made without departing from the spirit and scope of the invention and it is intended therefore in the appended claims to cover all such changes and modifications.

What is claimed as new and desired to be secured by Letters Patent is:

1. A device for displaying posters comprising a web, a housing, means for moving the web within the housing, means for arresting the movement of the web at predetermined periods to display said posters, means for illuminating the web while the web is in motion, and means controlled by said web for differently illuminating the web while the web is at rest.

2. In a device for displaying posters, a pair of rollers, a web comprising a series of posters carried by said rollers, means including cam elements for attaching said posters to one another to form a web, a driving motor for said web, means including a thermal device controlled by said cam elements for automatically causing intermittent movement of the motor and web as each poster is brought into the display position, and means including a switch controlled by the web for causing the direction of movement of the web to be reversed when the series of posters has been displayed.

3. In a poster display device, a housing having an aperture therein, a series of posters, means for connecting said posters to form a web, means including a motor for moving the web in either direction relative to said aperture to display the posters successively, means including a thermal device controlled by each of the connecting means for arresting the movement of the motor and web as each poster is brought into the display position behind the aperture, means for thereafter causing movement of the motor and web to be resumed, and other means including a switch controlled by at least two of the connecting means for automatically reversing the direction of movement of the motor and web when the series of posters has been displayed.

4. In a display device, a series of posters, a series of connecting devices for connecting said posters to form a web, means including a pair of rollers for causing movement of said web in either direction, thermal means controlled by each of the connecting devices for temporarily arresting the movement of the web at periodic intervals thereby to display the posters, means including a switch mechanism controlled by the first and last connecting device of the series for reversing the direction of movement of the web when the series of posters has been displayed, and means controlled by the connecting devices for illuminating said posters when the web is in motion and brightly illuminating the displayed poster when the movement of the web has been arrested.

5. In an advertising display device, a web comprising a series of posters, supporting means for said web including a pair of rollers, driving means including a motor armature for causing operation of the rollers, and means controlled by the web for periodically arresting the movement of the web, said last named means including a switch element for short-circuiting said motor armature to quickly stop the motor and web after said switch element has operated.

6. In a display device, a series of connected posters, means for connecting said posters to form a web, a pair of rollers for supporting said web, driving means including a motor for operating the rollers in either direction, compensating means operatively connected to at least one of the rollers for maintaining the web taut as the device operates, cam elements connected to each poster, a switch actuated by the said cam elements, a thermal switch operated by said first named switch for temporarily arresting the movement of the motor and web as the first named switch is engaged by each cam element, and contact means in said thermal switch for causing movement of said motor and the web driven thereby to be resumed after predetermined intervals of time.

7. In a display device for posters, the combination of a movable web comprising a series of posters, means including a motor for intermittently moving said web, a first means including a lamp for illuminating the displayed posters while the web is in motion in one direction, a second means including a lamp for additionally illuminating the displayed posters only while the web is at rest, means controlled by the web for reversing the direction of movement of the web, and means effective when the movement of the web has been reversed for causing said first lamp means to illuminate the web only while the web is at rest and the said second lamp means to be effective while the web is in motion.

8. A device for displaying posters comprising a web, a housing, means for moving the web within the housing, means controlled by said web for arresting the movement of the web to display said posters as each poster is brought into the display position, means for illuminating the web, and means controlled by the web for increasing the degree of illumination of the web in accordance with the position of the web.

9. In a display device, a series of posters, means for connecting said posters to form a web, means including a motor for causing movement of said web in either direction, thermal means controlled by said connecting means for arresting the movement of the web at periodic intervals thereby to display the posters, means controlled by the web for reversing the direction of movement of the web when the series of posters has been displayed, and means controlled by said connecting means for illuminating said posters when the web is in motion and differently illuminating the posters when the movement of the web has been arrested.

10. In a poster display device, the combination of a movable web comprising a series of posters, means including a motor for intermittently moving said web, means controlled by the web for reversing the movement of the web, means for illuminating the displayed posters while the web is in motion, and means controlled by said web for increasing the degree of illumination while the web is at rest.

ROBERT L. DAINE.
HAROLD F. MAY.